(No Model.)
C. F., A. W. & A. L. LAWTON.
Process of Preserving Organic Substances.
No. 241,677. Patented May 17, 1881.
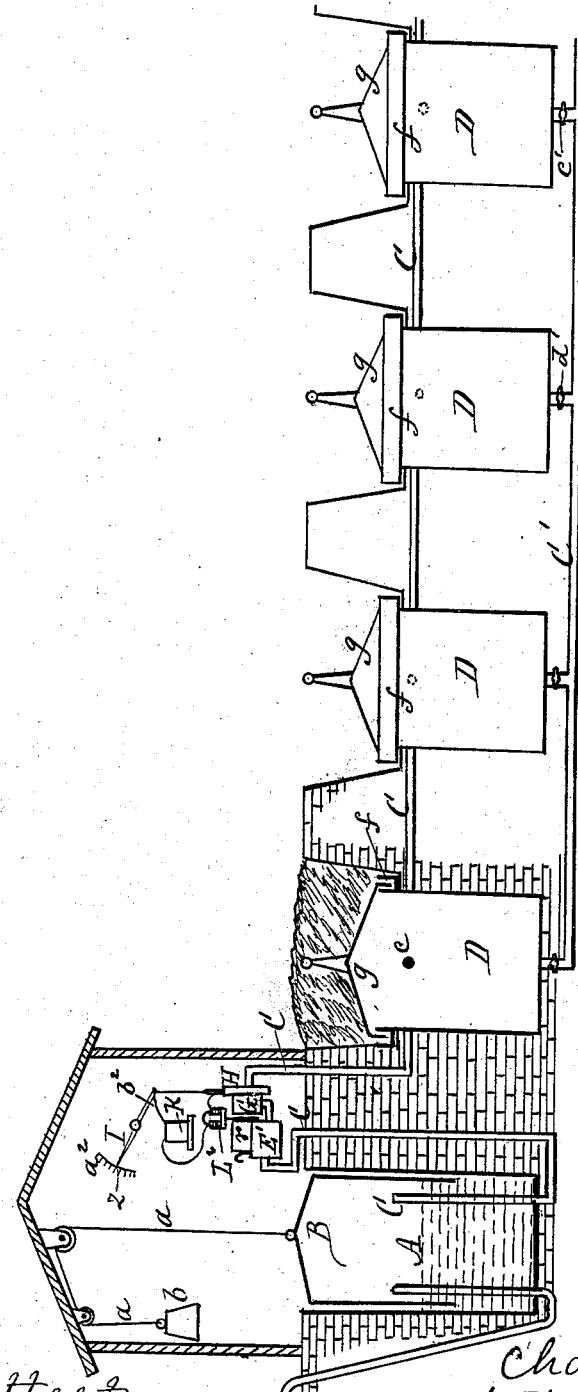
Attest.
Edward P. Follett
Jacob Spahr
Inventors.
Chas. F. Lawton,
Arthur W. Lawton,
Albert L. Lawton,
per R. F. Osgard,
Atty.

UNITED STATES PATENT OFFICE.

CHARLES F. LAWTON, ARTHUR W. LAWTON, AND ALBERT L. LAWTON, OF ROCHESTER, NEW YORK.

PROCESS OF PRESERVING ORGANIC SUBSTANCES.

SPECIFICATION forming part of Letters Patent No. 241,677, dated May 17, 1881.

Application filed December 6, 1880. (No model.)

*To all whom it may concern:*

Be it known that we, CHARLES F. LAWTON, ARTHUR W. LAWTON, and ALBERT L. LAWTON, all of Rochester, Monroe county, New York, have invented a new and useful Process for Preserving Fruits, Vegetables, and other Organic Substances by Certain Mixed Gases; and we do hereby declare that the following is a full, clear, and exact description of the same.

Our improvement relates to the preserving of fruits, vegetables, meats, and other organic substances in bulk (usually placed in packages, barrels, or crates) in closed chambers or receptacles having surplus space, by the use of gases which are admitted to the chambers or receptacles surrounding or covering the materials and held under pressure in permanent contact therewith during the whole time that the preserving action continues.

The invention consists, first, in the process of preserving such substances in bulk in closed chambers or receptacles having surplus space, by the use of mixed nitrogen and carbonic-oxide gases, so that sufficient open space is preserved in the chambers or receptacles for the requisite quantity of the gases to act effectively upon the materials to be preserved, the nitrogen being in excess of the carbonic oxide, so as to form the bulk or body of the preserving-gases, and the carbonic oxide being in limited quantity to insure safety in use; second, the process of preserving, as above described, by the use of mixed nitrogen and carbonic-oxide gases in the proportions substantially as hereinafter specified.

The gases may be prepared and mixed in any suitable way; but we prefer the plan described in another application for patent filed by us now pending, in which the gases are generated simultaneously in a retort or furnace. These mixed gases, after being purified, are conveyed to the preserving chambers or receptacles, wherein have been placed the materials to be preserved, and are held there in contact with and surrounding the materials during the whole time that the preserving action goes on.

Any suitable chambers and apparatus may be used for holding the materials to be preserved and supplying the gas thereto.

The drawing shows a series of preserving-chambers, D D D, with a supply gas-pipe, C, leading from a gasometer and opening therein, and provided also with a discharge-pipe, C', by which the air escapes when the gas is let on. The pipes C C' are provided with cocks, by which, when the chambers are once filled with gas to the exclusion of air, the gas can be confined and held in the chambers permanently, or a new supply can be admitted at any time for recharging or to compensate for leakage in the chambers. The chambers are provided with packed removable tops or with packed doors to allow insertion or removal of the materials to be preserved. During the whole time of preserving the cocks are kept open, so that the gases flow into all the chambers and remain under sufficient pressure from the gasometer to insure an automatic replacing of the gases should they leak from the chambers. In this mixture of the gases the nitrogen is in excess and forms the great bulk or body of the preserving medium. The proportions we have found most effective for the purpose are about sixty-five per cent. of nitrogen and thirty-five per cent of carbonic oxide, by volume; but the proportions may be varied somewhat. The nitrogen is very cheap, safe, and harmless, and to a certain extent is a good preservative; hence the great bulk of the preserving medium is composed of it. The carbonic oxide is dangerous in its pure state, as it is subject to explosion by fire when mixed with the oxygen of the air, and is fatal to breathe; hence a small quantity only is used. When so used in connection with nitrogen in tight chambers fermentation and decay will be prevented indefinitely.

We are aware that it has been proposed to employ mixed nitrogen and carbonic oxide in indefinite proportions for preserving meats in sealed cans. In such case the cans are small and usually filled with the materials to be preserved; but very little space is left for the preserving-gases, and consequently there could not be enough thereof to serve their purpose. In contradistinction to such use, we place the materials in bulk or quantity—usually contained in barrels, packages, or crates as used in shipping—in comparatively large chambers having surplus space and admitting the mixed gases, in which case a large volume of the gases, as compared with the materials to be preserved, is used, and the gases having a free circulation in the surplus space are effective. In thus packing in bulk not only is much surplus space left in the chambers to contain the gases, but interstices or passages are left between the materials through which the gases circulate freely, and they are thus brought into intimate contact with the whole surface of the materials. In fact, the materials are surrounded by an atmosphere of the gases which exceed in volume the space occupied by the materials, and the free circulation of the same through all of the materials under sufficient pressure insures effective action in preserving.

It is apparent that the gases must have free passage and access to all parts of the materials to be preserved; but as packed in dry barrels, packages, or crates ordinarily used, the seams and cracks are sufficient to admit the gases. In the preservation of meats they are usually hung in halves or quarters or large pieces in the chambers, and the gases have free access to the same.

Having thus described our invention, we disclaim the use of mixed nitrogen and carbonic-oxide gases in sealed cans for preserving meats, &c.

What we claim as new, and desire to secure by Letters Patent, is—

1. The process herein described of preserving fruits, vegetables, meats, and other organic substances, which consists in placing the substances in bulk in a chamber or receptacle of comparatively large size having surplus space and subjecting them to the action of an atmosphere of mixed nitrogen and carbonic-oxide gases under pressure admitted to the chamber and surrounding the substances, whereby the gases have surplus space and free circulation through the chamber, and are brought in intimate contact with the materials to be preserved, as herein set forth.

2. The process herein described of preserving fruits, vegetables, and other organic substances in bulk in a closed chamber or receptacle by substituting for the air a mixture of nitrogen and carbonic-oxide gases under pressure mixed in the proportions of about sixty-five per cent. of nitrogen to thirty-five per cent. of carbonic oxide admitted into the chamber and surrounding the materials, as herein specified.

In witness whereof we have hereunto signed our names in the presence of two subscribing witnesses.

CHAS. F. LAWTON.
ARTHUR W. LAWTON.
ALBERT L. LAWTON.

Witnesses:
FRANK J. EIGHONE,
R. F. OSGOOD.